US012682910B2

(12) United States Patent
Cohen et al.

(10) Patent No.: US 12,682,910 B2
(45) Date of Patent: Jul. 14, 2026

(54) PARTIALLY ADAPTIVE AUDIO BEAMFORMING SYSTEMS AND METHODS

(71) Applicant: Shure Acquisition Holdings, Inc., Niles, IL (US)

(72) Inventors: Israel Cohen, Haifa (IL); Baruch Berdugo, Kiryat Ata (IL)

(73) Assignee: Shure Acquisition Holdings, Inc., Niles, IL (US)

( * ) Notice: Subject to any disclaimer, the term of this patent is extended or adjusted under 35 U.S.C. 154(b) by 158 days.

(21) Appl. No.: 18/421,920

(22) Filed: Jan. 24, 2024

(65) Prior Publication Data

US 2024/0249742 A1 Jul. 25, 2024

Related U.S. Application Data

(60) Provisional application No. 63/481,522, filed on Jan. 25, 2023.

(51) Int. Cl.

*G10L 21/0232* (2013.01)
*G10L 21/0208* (2013.01)
*G10L 21/0216* (2013.01)
*G10L 25/84* (2013.01)

(52) U.S. Cl.

CPC .......... *G10L 21/0232* (2013.01); *G10L 25/84* (2013.01); *G10L 2021/02082* (2013.01); *G10L 2021/02166* (2013.01)

(58) Field of Classification Search

CPC ..... G10L 21/0232; G10L 25/84; G10L 25/78; G10L 21/0216; G10L 2021/02166; G10L 2021/02082; H04R 3/02; H04R 3/005; H04R 29/005; H04R 2430/20

See application file for complete search history.

(56) References Cited

U.S. PATENT DOCUMENTS

| | | | | |
|---|---|---|---|---|
| 9,508,359 | B2 | 11/2016 | Gao | |
| 9,538,285 | B2 | 1/2017 | Rayala | |
| 9,659,576 | B1 * | 5/2017 | Kotvis | G10L 21/0224 |
| 10,229,698 | B1 | 3/2019 | Chhetri | |

(Continued)

FOREIGN PATENT DOCUMENTS

| | | |
|---|---|---|
| CN | 108872946 | 11/2018 |
| DE | 102019105458 | 9/2020 |

(Continued)

OTHER PUBLICATIONS

Burton, "Acoustic Echo Cancellation in the Presence of Microphone Arrays," Thesis submitted to the Faculty of Graduate Studies and Research, Ottawa-Carleton Institute for Electrical and Computer Engineering, Dec. 2004, 126 pp.

(Continued)

*Primary Examiner* — Yogeshkumar Patel
(74) *Attorney, Agent, or Firm* — ALSTON & BIRD LLP

(57) ABSTRACT

Partially adaptive audio beamforming systems and methods are provided that enable improved acoustic echo cancellation of sound played on a loudspeaker that is in close proximity to a microphone array in an audio device. A stored beamformer parameter, such as an inverse covariance matrix, can be utilized by a frequency domain beamformer to generate a beamformed signal. The overall performance and resource usage by the audio device can be optimized.

22 Claims, 6 Drawing Sheets

(56) References Cited

U.S. PATENT DOCUMENTS

| | | | | |
|---|---|---|---|---|
| 10,559,317 | B2 | 2/2020 | Allen | |
| 10,573,301 | B2 | 2/2020 | Kupryjanow | |
| 11,172,291 | B2 | 11/2021 | Labosco | |
| 11,272,064 | B2 | 3/2022 | Pandey | |
| 11,277,685 | B1 | 3/2022 | Ayrapetian | |
| 2012/0243698 | A1 * | 9/2012 | Elko | H04M 9/082<br>381/66 |
| 2016/0241955 | A1 * | 8/2016 | Thyssen | H04R 3/005 |
| 2019/0313187 | A1 * | 10/2019 | Stoltze | H04R 3/005 |
| 2020/0145752 | A1 * | 5/2020 | Janse | H04R 3/005 |
| 2022/0086564 | A1 | 3/2022 | Bou Daher | |
| 2022/0116733 | A1 | 4/2022 | Kuthuru | |
| 2022/0369030 | A1 * | 11/2022 | Souden | H04R 5/04 |

FOREIGN PATENT DOCUMENTS

| | | |
|---|---|---|
| EP | 2748817 | 7/2014 |
| WO | 2018158558 | 9/2018 |

OTHER PUBLICATIONS

International Search Report and Written Opinion for PCT/US2024/012839 dated Apr. 26, 2024, 16 pp.

* cited by examiner

PARTIALLY ADAPTIVE AUDIO BEAMFORMING SYSTEMS AND METHODS

CROSS-REFERENCE

This application claims priority to U.S. Provisional Patent App. No. 63/481,522, filed on Jan. 25, 2023, the contents of which are incorporated herein in their entirety.

TECHNICAL FIELD

This application generally relates to audio beamforming. In particular, this application relates to partially adaptive audio beamforming systems and methods usable in audio devices having a microphone array and a loudspeaker in close proximity, and enables improved acoustic echo cancellation of sound played on the loudspeaker through the use of a frequency domain beamformer having a stored beamformer parameter.

BACKGROUND

Conferencing environments, such as conference rooms, boardrooms, video conferencing applications, and the like, can involve the use of microphones for capturing sound from various sound sources that are active in such environments. Such sound sources may include humans talking, for example. The captured sound may be disseminated to a local audience in the environment through amplified speakers (for sound reinforcement), and/or to others remote from the environment (such as via a teleconference and/or a webcast). The types of microphones and their placement in a particular environment may depend on the locations of the sound sources, physical space requirements, aesthetics, room layout, and/or other considerations. For example, in some environments, the microphones may be placed on a table or lectern near the sound sources. In other environments, the microphones may be mounted overhead to capture the sound from the entire room, for example. Accordingly, microphones are available in a variety of sizes, form factors, mounting options, and wiring options to suit the needs of particular environments.

Microphone arrays having multiple microphone elements can provide benefits such as steerable coverage or pick-up patterns having lobes and/or nulls, which allow the microphones to focus on desired sound sources and reject unwanted sounds such as room noise and other undesired sound sources. The ability to steer audio pick-up patterns provides the benefit of being able to be less precise in microphone placement, and in this way, microphone arrays are more forgiving. Moreover, microphone arrays provide the ability to pick up multiple sound sources with one microphone array or unit, again due to the ability to steer the pick-up patterns.

Beamforming is used to combine signals from the microphone elements of microphone arrays in order to achieve a certain pick-up pattern having one or more lobes and/or nulls. However, even though the lobes of a pick-up pattern may be steered to detect sounds from desired sound sources (e.g., a talker in the local environment), the lobes may also detect sounds from undesired sound sources. The detection of sounds from undesired sound sources may be particularly exacerbated when a loudspeaker is in close physical proximity to the microphone elements of a microphone array, e.g., in audio devices such as speakerphones. For example, the microphone elements may pick up the sound from a remote location (e.g., the far end of a teleconference) that is being played on the loudspeaker. In this situation, the audio transmitted to the remote location may therefore include an undesirable echo, e.g., sound from the local environment as well as sound from the remote location.

Acoustic echo cancellation systems may be able to remove such echo that is picked up by the microphone array before the audio is transmitted to the remote location. However, a typical acoustic echo cancellation system may work poorly and have suboptimal performance if it needs to constantly readapt and/or is overwhelmed, such as when the sound from a physically proximate loudspeaker is being continually detected by the microphone array. For example, the echo-to-signal ratio in such a situation may be greater than 30 dB, while an adaptive filter in a typical acoustic echo cancellation system may remove the linear portion of the echo by up to 20 dB. The echo-to-signal ratio of the adaptive filter's output may therefore be greater than 10 dB, which can be difficult for a non-linear processor to handle without distorting desired sound sensed by the microphone array. As such, the sound from the loudspeaker (which may include audio from the remote location) may not be completely cancelled by a typical acoustic echo cancellation system and may be transmitted to the remote location.

Furthermore, existing beamforming techniques may be able to attenuate only certain portions of an echo signal, e.g., linear portions, without distorting the audio of desired sound sources in the local environment, and/or more fully attenuate the echo signal while distorting the audio of desired sound sources. In order to more fully attenuate the echo signal without distorting the audio of desired sound sources, existing beamforming techniques may be computationally and memory resource intensive and therefore difficult to implement in certain types of audio devices.

Accordingly, there is an opportunity for audio beamforming systems and methods that enable improved acoustic echo cancellation of a signal played on a loudspeaker that is in close proximity to a microphone array.

SUMMARY

The techniques of this disclosure are intended to solve the above-described problems by providing audio beamforming systems and methods that are designed to, among other things: (1) generate a beamformed audio signal from microphone audio signals using a frequency domain beamforming technique with a stored beamforming parameter associated with a loudspeaker, such as an inverse covariance matrix; (2) utilize a different beamforming technique to process the microphone audio signals when voice activity is not detected in the sound played on the loudspeaker; (3) update beamformer coefficients of the frequency domain beamforming technique when voice activity is not detected in the sound played on the loudspeaker; (4) improve and enhance the performance of downstream processing, such as acoustic echo cancellation, by generating the beamformed audio signal to attenuate the sound played on the loudspeaker while minimizing distortion of desired sound picked up by the microphones; and (5) reduce the use of computational and memory resources by avoiding real-time calculation of a beamforming parameter used by the frequency domain beamforming technique.

In an embodiment, an audio device includes a plurality of microphones configured to generate a plurality of audio signals, a loudspeaker configured to play back a reference signal, and a first beamformer configured to generate a first beamformed signal. The first beamformed signal may be based on the plurality of audio signals and a set of beamformer coefficients associated with a steering vector. The first beamformer may be configured to process the plurality of audio signals using a frequency domain beamforming technique with a stored beamforming parameter associated with the loudspeaker.

In another embodiment, a method includes receiving a plurality of audio signals from a plurality of microphones, receiving a reference signal for playback on a loudspeaker, and generating a first beamformed signal, using a first beamformer. The first beamformed signal may be generated based on the plurality of audio signals and a set of beamformer coefficients associated with a steering vector, and may include processing the plurality of audio signals using a frequency domain beamforming technique with a stored beamforming parameter associated with the loudspeaker.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
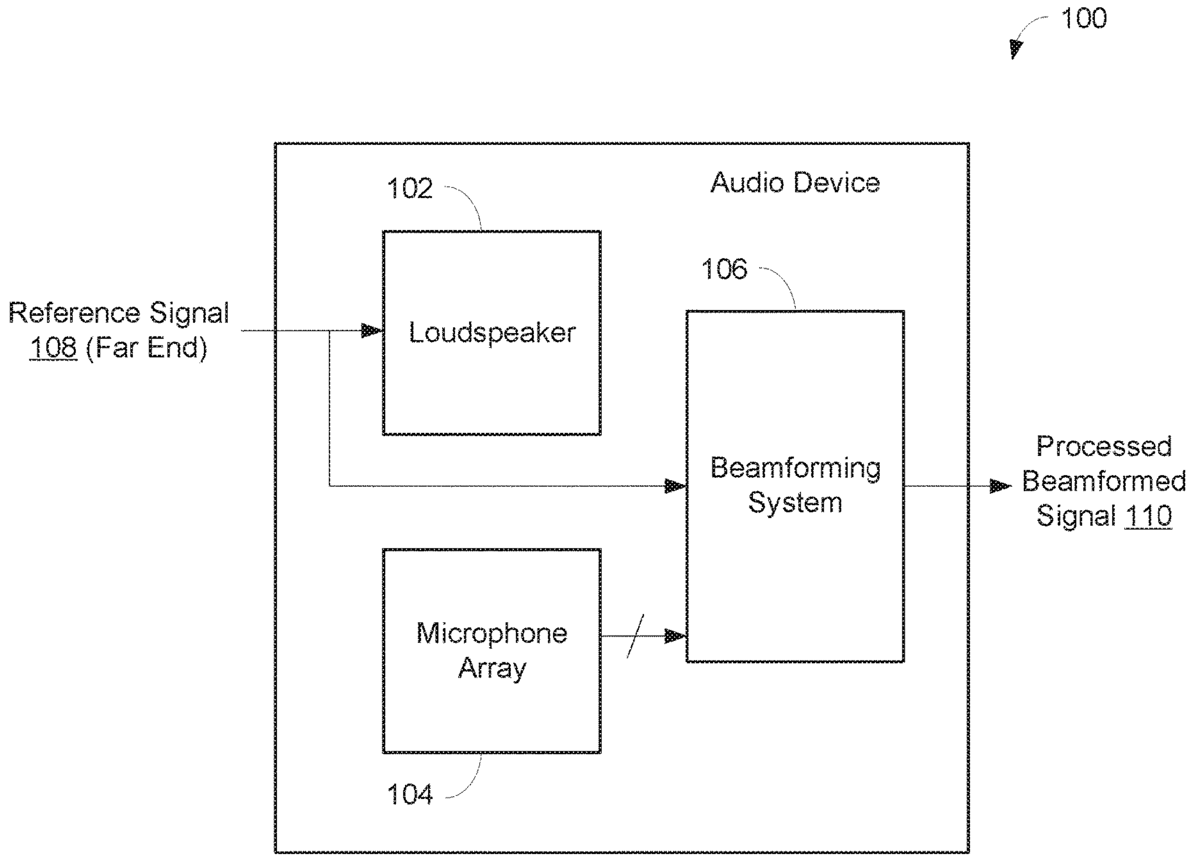
FIG. 1 is a block diagram of an audio device including a loudspeaker, a microphone array, and a beamforming system, in accordance with some embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

The audio beamforming systems and methods described herein can enable audio devices having a microphone array and a loudspeaker in close proximity to attain improved acoustic echo cancellation (AEC) processing of audio captured by the microphone array. The systems and methods may generate a beamformed audio signal from audio signals of the microphone array by using a frequency domain beamforming technique with a stored beamforming parameter associated with the loudspeaker, such as an inverse covariance matrix. Even for a non-linear loudspeaker, the undesired sound generated by such a loudspeaker may be linearly related to the audio signals from the microphone array. Hence, the systems and methods may more completely attenuate the undesired sound played on the loudspeaker while minimizing distortion of the desired sound captured by the microphone array, e.g., speech from a talker in the local environment.

Furthermore, the frequency domain beamforming technique may be executed using less computational resources by avoiding the continuous calculation of the beamforming parameter in real time. As such, computational resources can be preserved for use by a downstream processing module that may operate on the beamformed audio signal. The downstream processing module may include an adaptive filter for acoustic echo cancellation of residual echo, a non-linear processor to remove residual non-linear echo, and/or automatic gain control. The performance of the downstream processing module may accordingly be enhanced and improved since the beamformed signal may include less undesired sound to be removed, e.g., sound from a remote location that is played on a loudspeaker.

When voice activity is not present in the sound played on the loudspeaker, the beamformed audio signal may be generated from the audio signals of the microphone array using a different beamforming technique that is more simplified and less resource intensive than the frequency domain beamforming technique. The coefficients of the frequency domain beamforming technique may be updated based on a steering vector that points towards a desired sound source, when there is no voice activity in the sound played on the loudspeaker.

FIG. 1 is a block diagram of an audio device 100 including a loudspeaker 102, a microphone array 104, and a beamforming system 106. In embodiments, the loudspeaker 102 and the microphone array 104 may be in close physical proximity to one another and/or located in the same housing, such as when the audio device 100 is a speakerphone. The audio device 100 may receive a reference signal 108, such as the sound from remote participants at the far end of a teleconference. The reference signal 108 may be played on the loudspeaker 102 so that local participants at the near end of the teleconference may hear the sound from the remote participants and/or to play other sounds. Various components included in the audio device 100 may be implemented using software executable by a computing device with a processor and memory, and/or by hardware (e.g., discrete logic circuits, application specific integrated circuits (ASIC), programmable gate arrays (PGA), field programmable gate arrays (FPGA), etc.

The audio device 100 may be utilized in a conference room or boardroom and be placed on a table, lectern, desktop, etc., for example, where the sound sources may be one or more human talkers and/or other desirable sounds. Other sounds may be present in the environment which may be undesirable, such as sounds from loudspeakers (e.g., sound from a remote location of a teleconference), noise from ventilation, other persons, audio/visual equipment, electronic devices, etc. In a typical situation, the sound sources may be seated in chairs at a table, although other configurations and placements of the sound sources are contemplated and possible.

The microphone array 104 may include a suitable number of microphone elements 104*a, b, c, . . . , z* (depicted in FIG. 2) that can detect sounds from sound sources at various frequencies. The microphone elements 104*a, b, c, . . . , z* may each be a MEMS (micro-electrical mechanical system) microphone, in some embodiments. In other embodiments, the microphone elements 104*a, b, c, . . . , z* may be electret condenser microphones, dynamic microphones, ribbon microphones, piezoelectric microphones, and/or other types of microphones. In embodiments, the microphone elements 104*a, b, c, . . . , z* may be unidirectional microphones that are primarily sensitive in one direction. In other embodiments, the microphone elements 104*a, b, c, . . . z* may have other directionalities or polar patterns, such as cardioid, subcardioid, or omnidirectional.

Each of the microphone elements 104*a, b, z* in the microphone array 104 may detect sound and convert the sound to an audio signal. Components in the audio device 100, such as analog to digital converters, processors, and/or other components, may process the audio signals and ultimately generate one or more digital audio output signals. In other embodiments, the microphone elements 104*a, b, c, . . . , z* may output analog audio signals so that other components and devices (e.g., processors, mixers, recorders, amplifiers, etc.) external to the audio device 100 that may process the analog audio signals.

The microphone elements 104*a, b, c, . . . , z* may be arranged in any suitable layout, including in concentric rings and/or be harmonically nested. The microphone elements 104*a, b, c, . . . , z* may be arranged to be generally symmetric or may be asymmetric, in embodiments. In further embodiments, the microphone elements 104*a, b, c, . . . , z* may be arranged on a substrate, placed in a frame, or individually suspended, for example. In an embodiment, the microphone elements 104*a, b, c, . . . , z* may be arranged on the perimeter of the audio device 100 and the loudspeaker 102 may be disposed in the center of the audio device 100. In embodiments, the microphone elements 104*a, b, c, . . . , z* included in the audio device 100 may be of a sufficient quantity to have enough degrees of freedom to suppress the echo (e.g., from the reference signal 108) while minimizing the distortion of the sound from the desired sound source that is sensed by the microphone array 104.

Figure 2:
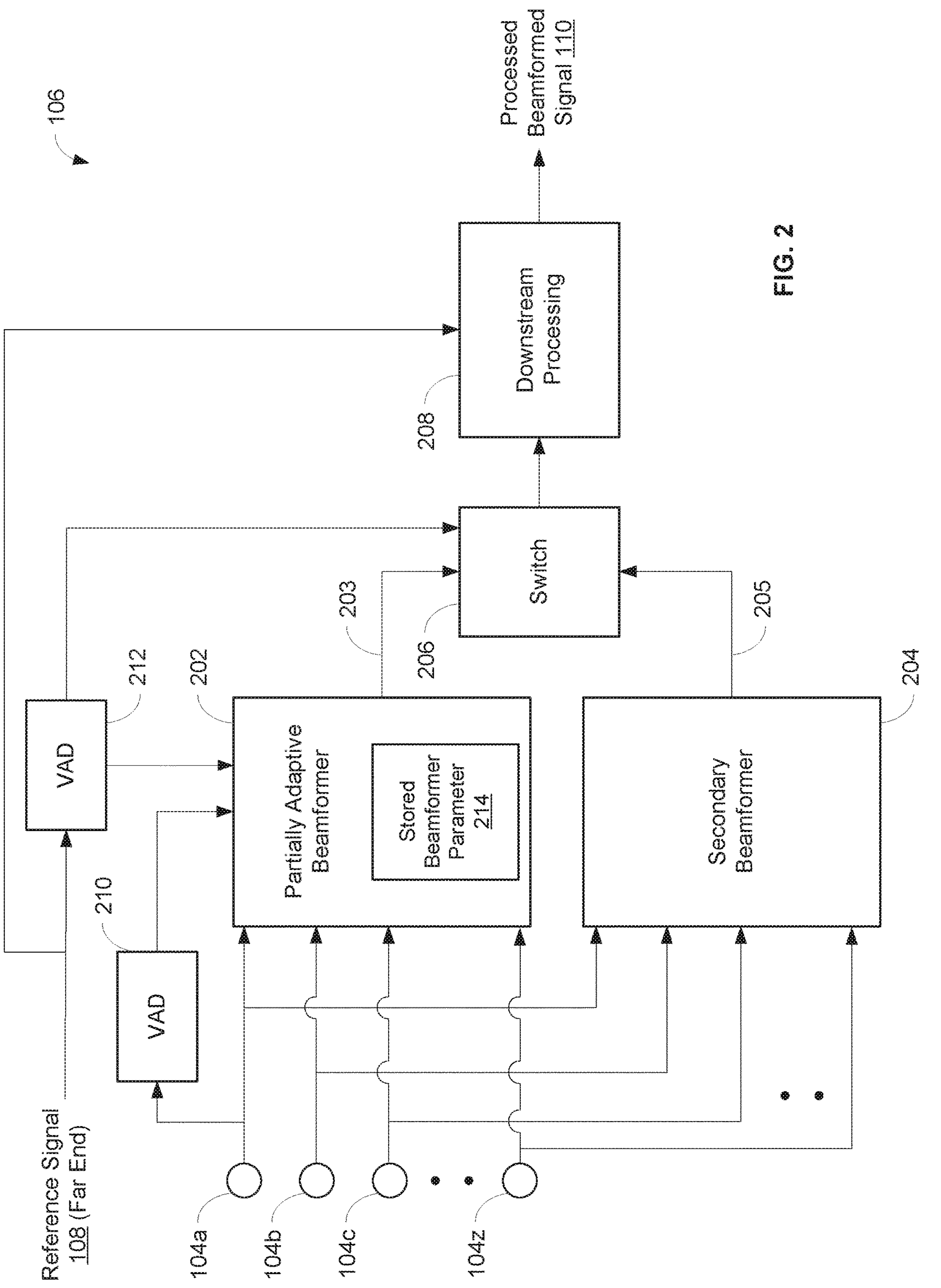
FIG. 2 is a block diagram of a beamforming system of the audio device of FIG. 1, in accordance with some embodiments.

FIG. 2 is a block diagram of the beamforming system 106 in the audio device 100 of FIG. 1. The beamforming system 106 may receive the audio signals from the microphone array 104 and the reference signal 108 in order to form pick-up patterns so that the sound from the sound sources is more consistently detected and captured. In particular, the beamforming system 106 may generate a processed beamformed signal 110 associated with one or more lobes steered towards the desired sound source location in the environment, as described in more detail below.

The beamforming system 106 may include a partially adaptive beamformer 202 and a secondary beamformer 204 that both receive audio signals from the microphone elements 104*a, b, c, . . . , z*. The partially adaptive beamformer 202 may use a frequency domain beamforming technique to create a beamformed signal 203 associated with one or more lobes steered towards desired sound source locations. The frequency domain beamforming technique of the partially adaptive beamformer 202 may create the beamformed signal 203 using coefficients that are based on the steering vector for the location of a desired sound source, as well as using a stored beamformer parameter 214. In embodiments, the frequency domain beamforming technique utilized by the partially adaptive beamformer 202 may be a minimum variance distortionless response (MVDR) beamforming technique and/or another appropriate beamforming technique. Other types of appropriate beamforming techniques may include those included in an adaptive beamformer that utilizes an inverse covariance matrix, such as a linearly constrained minimum variance (LCMV) beamformer, a generalized sidelobe canceller (GSC) beamformer, or a Wiener beamformer. The secondary beamformer 204 may use a time domain beamforming technique or a frequency domain beamforming technique, such as a delay and sum beamforming technique and/or another appropriate beamforming technique, to create a beamformed signal 205 associated with one or more lobes steered towards desired sound source locations. The secondary beamformer 204 may be configured to attenuate noise and interference in the environment.

The stored beamformer parameter 214 used by the partially adaptive beamformer 202 may be an inverse covariance matrix that is associated with the loudspeaker 102, in embodiments. The inverse covariance matrix may be representative of the amount of undesired sound, e.g., the echo from sound playing on the loudspeaker 102. The size of the inverse covariance matrix can be based on the number of microphone elements 104*a, b, c, . . . , z* in the microphone array 104. As such, calculating the inverse covariance matrix in real time can be computationally intensive, as would be done in a traditional MVDR beamformer. Furthermore, a covariance matrix has to be estimated when there is no near-end signal present (e.g., talking by local participants), which can be difficult to determine when there is a high echo-to-signal ratio due to the proximity of the loudspeaker 102 to the microphone array 104.

In contrast, the inverse covariance matrix used by the partially adaptive beamformer 202 may be determined and stored during the manufacture, installation, and/or calibration of the audio device 100, prior to regular usage of the audio device 100. The inverse covariance matrix may be determined and stored in this fashion because the loudspeaker 102 and the microphone array 104 are in close physical proximity to one another in the audio device 100. Therefore, the structure of the acoustic field generated by the loudspeaker 102 may be spatially constant and may not be significantly influenced by the environment where the audio device 100 is located. By using a stored beamformer parameter 214, e.g., an inverse covariance matrix, the partially adaptive beamformer 202 may be able to reduce and mitigate the echo generated by the direct path between the loudspeaker 102 and the microphone array 104. In embodiments, the inverse covariance matrix may be determined by the audio device 100 following the initial manufacture, installation, and/or calibration, in order to attain a more optimal inverse covariance matrix that takes into account the particular environment where the audio device 100 is located.

The steering vector for the location of a desired sound source may be determined or configured as a particular three-dimensional coordinate relative to the location of the audio device 100, such as in Cartesian coordinates (i.e., x, y, z), or in spherical coordinates (i.e., radial distance r, polar angle θ (theta), azimuthal angle φ (phi)), for example. In embodiments, the steering vector for the location of a desired sound source may be determined by an audio activity localizer or other suitable component(s) that can determine the location of audio activity in an environment based on the audio signals from the microphone elements 104*a, b, c, . . . , z*. For example, the audio activity localizer may utilize a Steered-Response Power Phase Transform (SRP-PHAT) algorithm, a Generalized Cross Correlation Phase Transform (GCC-PHAT) algorithm, a time of arrival (TOA)-based algorithm, a time difference of arrival (TDOA)-based algorithm, or another suitable sound source localization algorithm. In embodiments, the audio activity localizer may be included in the audio device 100, may be included in another component, or may be a standalone component. In other embodiments, the steering vectors for the location of a desired sound source may be determined programmatically or algorithmically using automated decision-making schemes, manually configured by a user, and/or adaptively determined.

The beamforming system 106 shown in FIG. 2 may also include a switch 206 that can select either the beamformed signal 203 (generated by the partially adaptive beamformer 202) or the beamformed signal 205 (generated by the secondary beamformer 204) for transmission to the downstream processing module 208. The switch 206 may be a signal selection mechanism that selects the beamformed signal 203 or the beamformed signal 205 based on whether voice activity is detected in the reference signal 108 by a voice activity detector 212. The beamformed signal 203 or the beamformed signal 205 may be processed by the downstream processing module 208 to generate a processed beamformed signal 110, as described in more detail below.

A voice activity detector 210 may also detect whether there is voice activity in the audio signals of the microphone array 104. In an embodiment, one of the audio signals of the microphone array 104, e.g., the audio signal from microphone element 104*a*, may be in communication with the voice activity detector 210, as shown in FIG. 2. In other embodiments, the voice activity detector 210 may detect whether there is voice activity in more than one audio signal of the microphone array 104. As described below in more detail with respect to FIG. 4, the detection of voice activity by the voice activity detector 210 may be utilized to determine whether to update a steering vector pointed towards the desired sound source in the environment. In embodiments, the voice activity detectors 210, 212 may be implemented by analyzing the spectral variance of an audio signal, using linear predictive coding, applying machine learning or deep learning techniques to detect voice, and/or using well-known techniques such as the ITU 6.729 VAD ETSI standards for voice activity detection calculation included in the GSM specification, or long-term pitch prediction.

Figure 3:
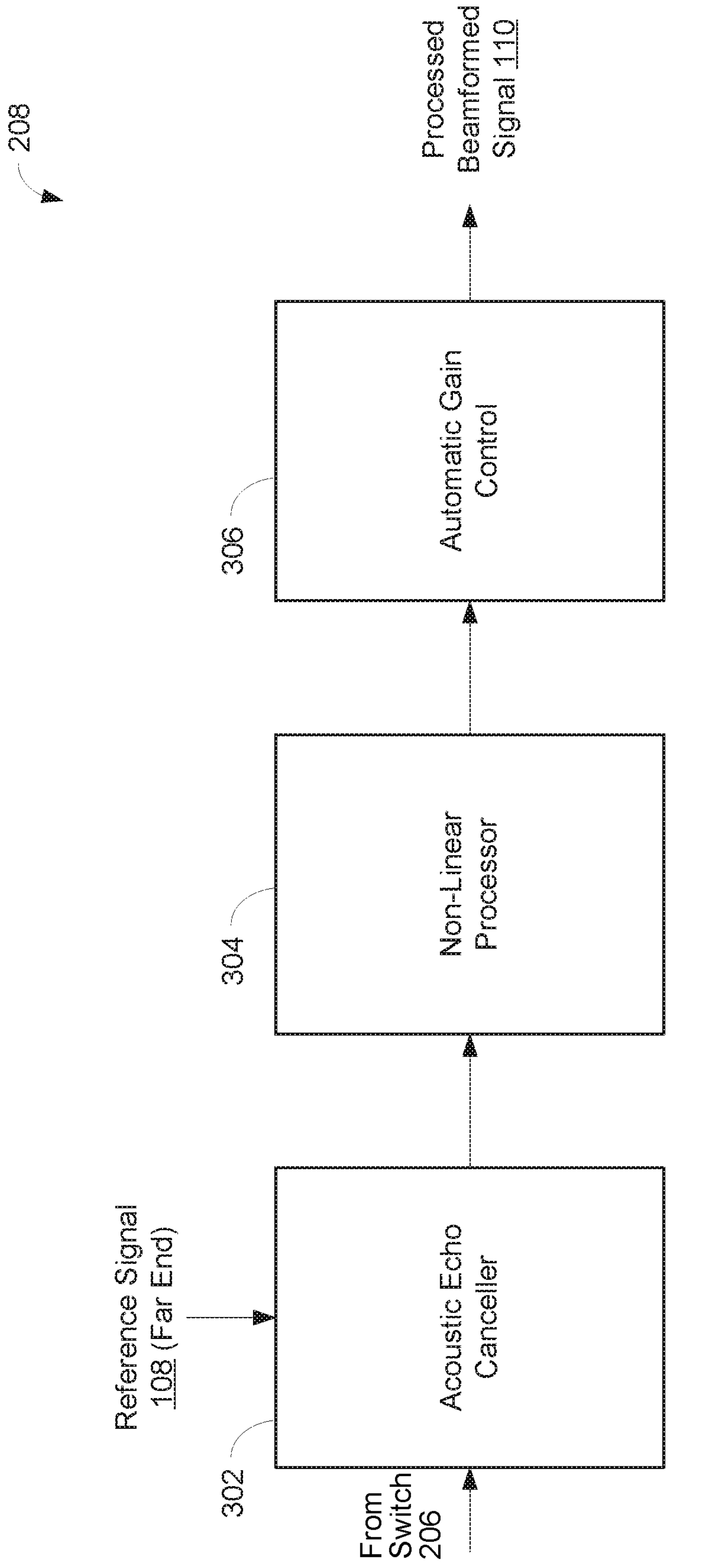
FIG. 3 is a block diagram of a downstream processing module of the beamforming system of FIG. 2, in accordance with some embodiments.

As shown in FIG. 3, the downstream processing module 208 may include components that can process the beamformed signal 203 or 205, such as an acoustic echo canceller 302, a non-linear processor 304, and/or an automatic gain control module 306. The downstream processing module 208 may also include other types of processing, in some embodiments, such as noise reduction or feedback reduction.

In embodiments, the acoustic echo canceller 302 in the downstream processing module 208 may remove the echo that may remain in the beamformed signal 203 generated by the partially adaptive beamformer 202, e.g., echo that is primarily due to reflections in the environment. The acoustic echo canceller 302 may be implemented using an adaptive filter running a least mean square (LMS) algorithm, a normalized LMS algorithm, a recursive least squares (RLS) algorithm, or another suitable algorithm. When in use, the acoustic echo canceller 302 may be able to use a greater amount of computational resources of the audio device 100 due to the partially adaptive beamformer 202 using a stored beamformer parameter 214 instead of needing to calculate a beamformer parameter in real time.

The non-linear processor 304 in the downstream processing module 208 may remove residual echo in the beamformed signal 203 that is not removed by the adaptive filter in the acoustic echo canceller 302, and also attenuate noise and interference in the environment. The residual echo removed by the non-linear processor 304 may include the non-linear component of the echo signal, e.g., the portion that has no linear relationship with the reference signal 108. In embodiments, the non-linear processor 304 may be implemented as a deep neural network, or be based on standard speech enhancement algorithms, for example.

As an example, the echo-to-signal ratio in the audio device 100 may be greater than 30 dB, and the partially adaptive beamformer 202 may remove about 20 dB of echo, leaving an echo-to-signal ratio of 10 dB at the output of the partially adaptive beamformer 202. The acoustic echo canceller 302 running an LMS algorithm may remove about 20 dB of echo, which leaves an echo-to-signal ratio of −10 dB at the output of the acoustic echo canceller 302. The non-linear processor 304 can more easily remove this amount of residual echo with minimal distortion of the desired sound sensed by the microphone array 104.

The automatic gain control module 306 in the downstream processing module 208 may adjust the level of an audio signal, e.g., beamformed signal 203 or 205, to be more balanced and consistent before generating and outputting the processed beamformed signal 110. For example, the automatic gain control module 306 may compensate for input level differences due to, for example, loud or soft talkers and/or talkers who are located nearer or farther from the audio device 100.

In embodiments, the downstream processing module 208 may process the beamformed signal 203 from the partially adaptive beamformer 202 or the beamformed signal 205 from the secondary beamformer 204 by using one, some, or all of the acoustic echo canceller 302, the non-linear processor 304, and the automatic gain control module 306. The processed beamformed signal 110 from the downstream processing module 208 may be transmitted to a remote location (e.g., a far end of a teleconference) and/or played in the local environment for sound reinforcement. In other embodiments, the beamformed signal 203 and/or the beamformed signal 205 may be transmitted to components or devices external to the audio device 100 and/or to a remote location, in addition to or in lieu of the processed beamformed signal 110 from the downstream processing module 208. In this way, the processed beamformed signal 110 may be, for example, transmitted to a remote location without the undesirable echo of persons at the remote location hearing their own speech and sound.

Figure 4:
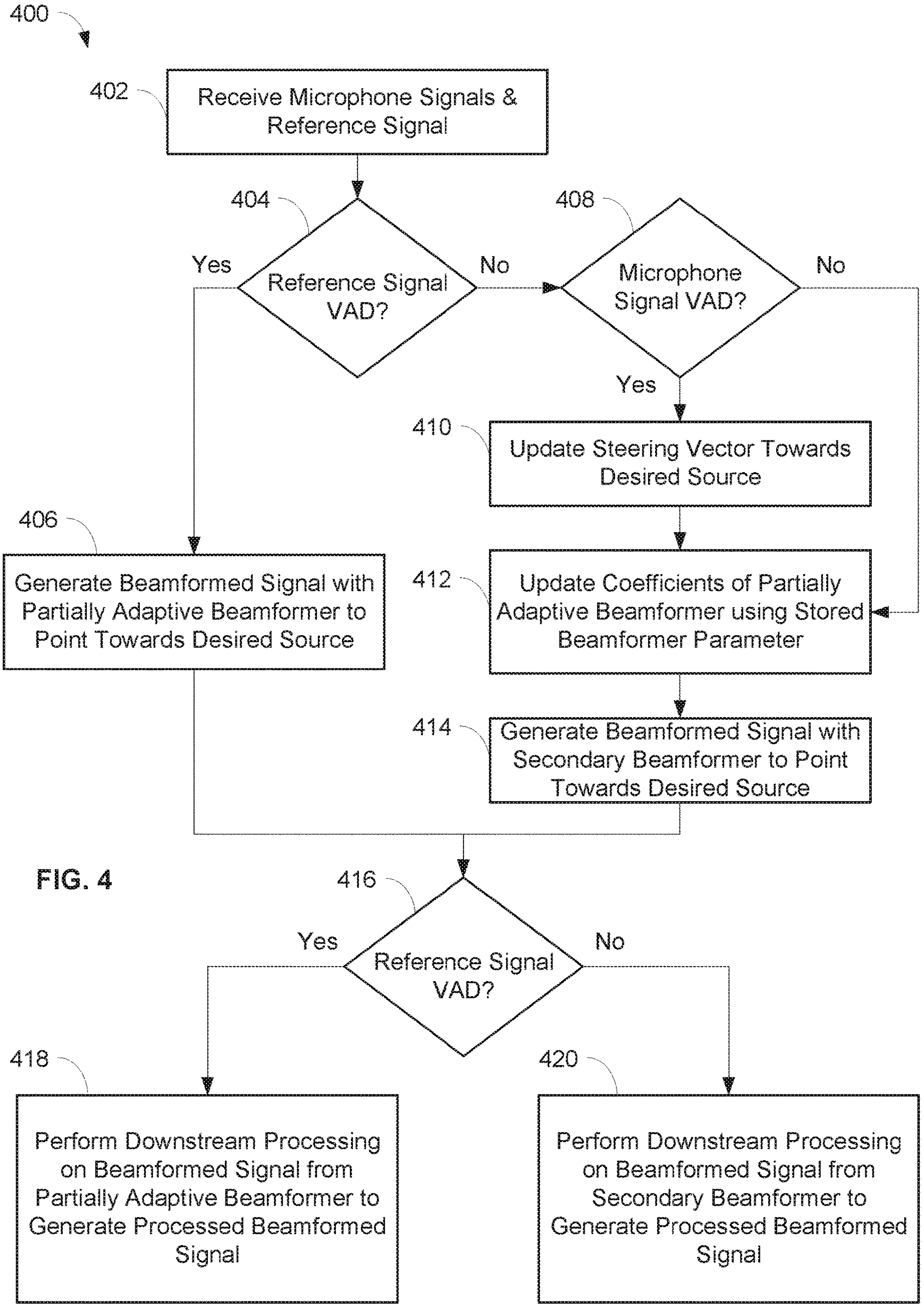
FIG. 4 is a flowchart illustrating operations for generating a beamformed audio signal based on a plurality of microphone elements and using the beamforming system of FIG. 2, in accordance with some embodiments.

An embodiment of a method 400 is shown in FIG. 4 for the beamforming of audio signals of a plurality of microphones using the beamforming system 106 of the audio device 100. The method 400 may be utilized to generate a processed beamformed signal 110 that is associated with lobes that are steered towards a desired sound source location while also attenuating the echo from a reference signal 108 being played on a loudspeaker 102. The processed beamformed signal 110 may be derived from a beamformed signal 203 generated by a partially adaptive beamformer 202 using a frequency domain beamforming technique with a stored beamforming parameter associated with the loudspeaker 102, when there is voice activity in the reference signal 108. When there is no voice activity in the reference signal 108 (e.g., half duplex near end periods), the processed beamformed signal 110 may be derived from a beamformed signal 205 generated by a secondary beamformer 204. In embodiments, the method 400 may be performed when the audio device 100 is in regular usage, e.g., when a user is conducting a teleconference with the audio device 100.

One or more processors and/or other processing components (e.g., analog to digital converters, encryption chips, etc.) within or external to the audio device 100 may perform any, some, or all of the steps of the method 400. One or more other types of components (e.g., memory, input and/or output devices, transmitters, receivers, buffers, drivers, discrete components, etc.) may also be utilized in conjunction with the processors and/or other processing components to perform any, some, or all of the steps of the method 400.

At step 402, the reference signal 108 and the audio signals from the microphone elements 104*a, b, c, . . . , z* may be received at the beamforming system 106. The reference signal 108 may include sound from remote participants at the far end of a teleconference, for example, and be received by a voice activity detector 212 and the downstream processing module 208. One or more of the audio signals from the microphone elements 104*a, b, c, . . . , z* may be received by the partially adaptive beamformer 202, the secondary beamformer 204, and the voice activity detector 210.

At step 404, it can be determined whether there is voice activity in the reference signal 108, such as by the voice activity detector 212. Voice activity may be present in the reference signal 108 when participants at the far end of a teleconference are speaking, for example. If it is determined that there is voice activity in the reference signal 108 at step 404 ("YES" branch of step 404), then the method 400 may continue to step 406. At step 406, the beamformed signal 203 may be generated by the partially adaptive beamformer 202, based on the audio signals received from the microphone elements 104*a, b, c, . . . , z* at step 402, the stored beamformer parameter 214, and beamformer coefficients (that are based on the steering vector for a desired sound source). The beamformed signal 203 may be associated with a lobe that is steered towards the desired sound source. The stored beamformer parameter 214 may include an inverse covariance matrix associated with the loudspeaker 102, in embodiments. The beamformer coefficients may be updated when there is no voice activity detected in the reference signal 108 by the voice activity detector 212. The method 400 may continue to step 416 after step 404, as described below.

Returning to step 404, if it is determined that there is no voice activity in the reference signal 108 ("NO" branch of step 404), then the method 400 may continue to step 408. At step 408, it can be determined whether there is voice activity in one or more of the audio signals from the microphone elements 104*a, b, c, . . . , z*, such as by the voice activity detector 210. Voice activity may be present in the audio signals from the microphone elements 104*a, b, c, . . . z* when participants in the local environment (e.g., at the near end of a teleconference) are speaking, for example. If it is determined that there is voice activity in one or more of the audio signals from the microphone elements 104*a, b, c, . . . z*, at step 408 ("YES" branch of step 408), then the method 400 may continue to step 410.

At step 410, the steering vector pointing towards the desired sound source may be updated. The steering vector may be updated when the desired sound source has changed locations and/or if the audio device 100 has changed locations, for example. The updated steering vector generated at step 410 may be utilized at step 412 to update coefficients for the partially adaptive beamformer 202. The updated steering vector generated at step 410 may also be utilized by the secondary beamformer 204 at step 414 to generate the beamformed signal 205. The method 400 may continue to step 412 following step 410, and also following step 408 if it is determined that there is not voice activity in one or more of the audio signals from the microphone elements 104*a, b, c, . . . , z*, ("NO" branch of step 408).

At step 412, the coefficients for the partially adaptive beamformer 202 may be updated based on the stored beamformer parameter 214 and based on the steering vector that points towards the desired sound source. In embodiments, the coefficients may be updated one frequency bin per time frame, in order to further reduce the use of computational resources of the audio device 100. As previously described, the coefficients may be used by the partially adaptive beamformer 202 to generate the beamformed signal 203 at step 406 when voice activity has been detected in the reference signal 108. The method 400 may continue to step 414 following step 412.

At step 414, the beamformed signal 205 may be generated by the secondary beamformer 204, based on the audio signals received from the microphone elements 104*a, b, c, . . . , z* at step 402, and based on the steering vector for a desired sound source generated at step 410. The beamformed signal 205 may be associated with a lobe that is steered towards the desired sound source. The method 400 may continue to step 416 following step 412, and also following step 406.

At step 416, it can be determined whether there is voice activity in the reference signal 108, such as by the voice activity detector 212. In embodiments, step 416 may utilize the result of step 404 described above. If it is determined that there is voice activity in the reference signal 108 at step 416 ("YES" branch of step 416), then the method 400 may continue to step 418. At step 418, the switch 206 may select the beamformed signal 203 from the partially adaptive beamformer 202 for transmission to the downstream processing module 208. The downstream processing module 208 may process the beamformed signal 203 at step 418 to generate the processed beamformed signal 110.

If it is determined that there is no voice activity in the reference signal 108 at step 416 ("NO" branch of step 416), then the method 400 may continue to step 420. At step 420, the switch 206 may select the beamformed signal 205 from the secondary beamformer 204 for transmission to the downstream processing module 208. The downstream processing module 208 may process the beamformed signal 205 at step 420 to generate the processed beamformed signal 110. As compared to the beamformed signals 203, 205, the processed beamformed signal 110 that is generated at step 418 and step 420 by the downstream processing module 208 may be processed to remove residual echo, to balance its audio level, and/or be subject to other processing.

Figure 5:
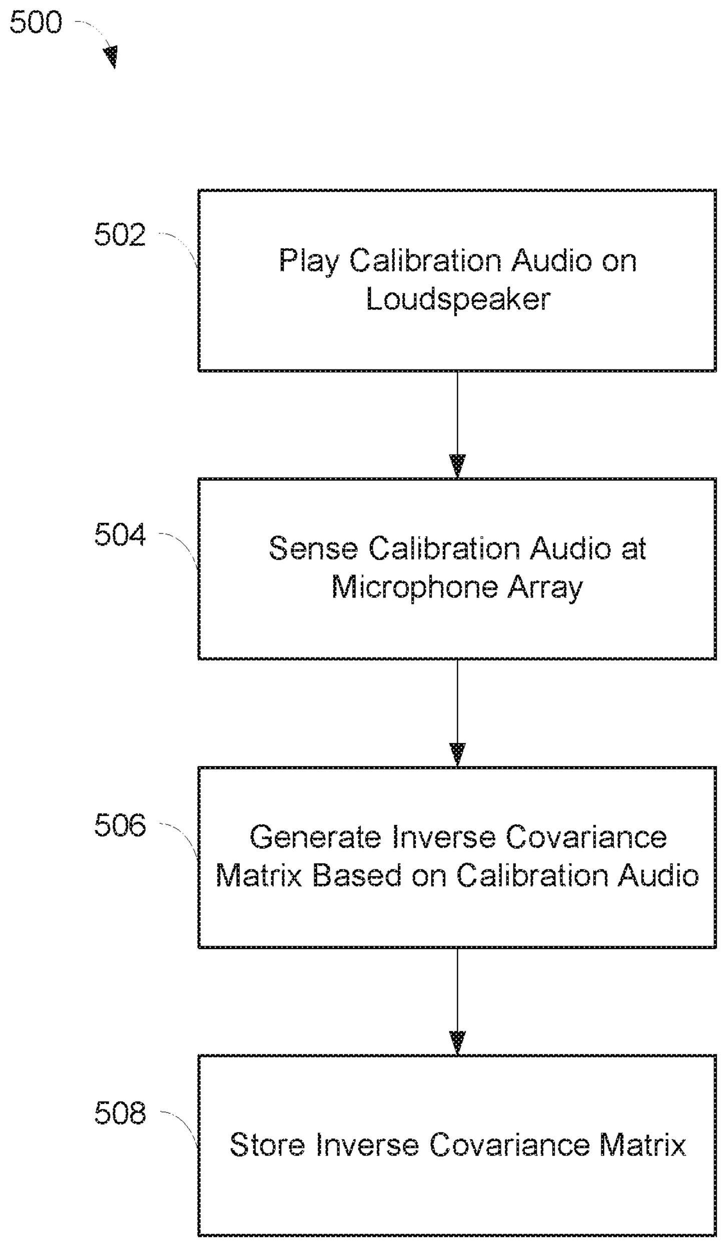
FIG. 5 is a flowchart illustrating operations for the generation and storage of an inverse covariance matrix for use with a frequency domain beamformer, in accordance with some embodiments.

An embodiment of a method 500 is shown in FIG. 5 for the generation and storage of an inverse covariance matrix for use with a frequency domain beamformer, such as the partially adaptive beamformer 202 of FIG. 2. The method 500 may be utilized to generate and store the inverse covariance matrix as the stored beamformer parameter 214 that is used by the partially adaptive beamformer 202. In some embodiments, the method 500 may be performed when the audio device 100 is not in regular usage, such as during manufacture, installation, or calibration of the audio device 100. In other embodiments, the method 500 may be performed when the acoustic echo canceller 302 of the audio device 100 is not performing optimally (e.g., when the audio device 100 has been moved to a new location that has different reflections in the environment), as described below in relation to the method 600 of FIG. 6. The inverse covariance matrix may be used by the partially adaptive beamformer 202 at step 406 of the method 400 described above, for example, when generating the beamformed signal 203.

At step 502, a calibration audio signal may be played on the loudspeaker 102 of the audio device 100. The calibration audio signal may include white noise and/or another appropriate type of sound, e.g., broadband sound that covers the frequency spectrum for a sufficient amount of time, such as speech or music. The calibration audio played on the loudspeaker 102 may be received and sensed by the microphone array 104 at step 504. Based on the calibration audio sensed by the microphone array 104 at step 504, an inverse covariance matrix can be generated at step 506. The inverse covariance matrix may be associated with the loudspeaker 102 and may represent an amount of undesired sound, such as the echo from sound playing on the loudspeaker 102. In embodiments, the inverse covariance matrix can be generated at step 506 for each frequency bin.

At step 508, the inverse covariance matrix generated at step 506 may be stored as the beamformer parameter 214 for use by the partially adaptive beamformer 202. In embodiments, the method 500 for generating an inverse covariance matrix may be performed for each particular audio device 100 since there may be differences in the positioning of the loudspeaker 102 and the microphone array 104 due to manufacturing tolerances and the like.

Figure 6:
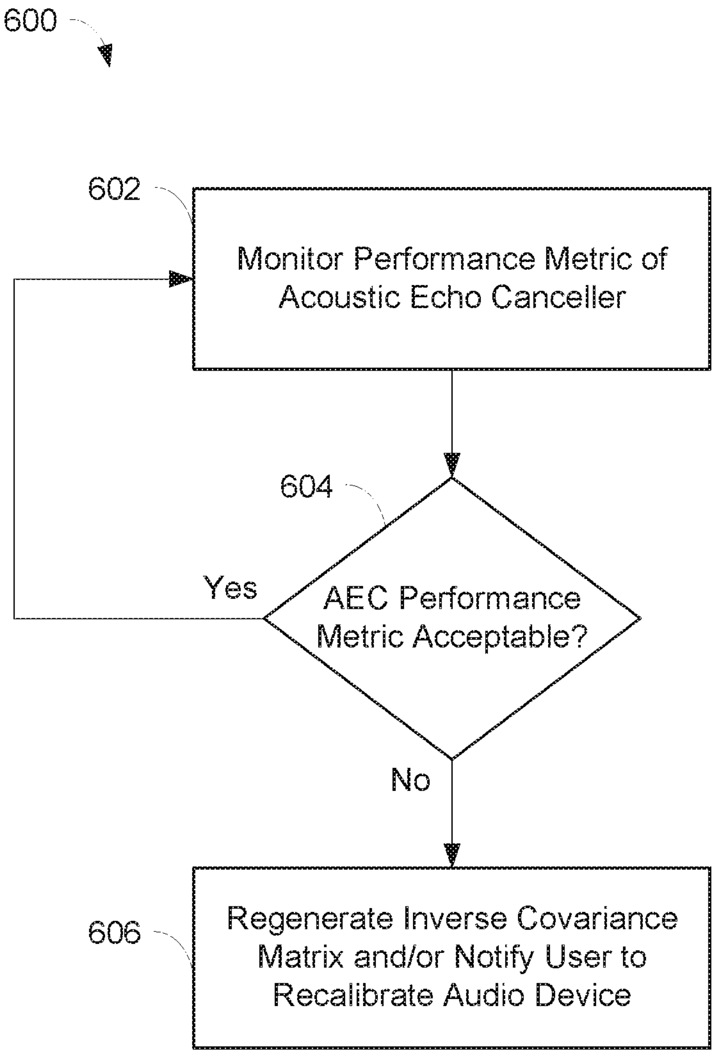
FIG. 6 is a flowchart illustrating operations for the regeneration of the inverse covariance matrix based on the performance of an acoustic echo canceller, in accordance with some embodiments.

An embodiment of a method 600 is shown in FIG. 6 for the regeneration of the inverse covariance matrix based on the performance of an acoustic echo canceller. The method 600 may be performed by the audio device 100 continuously, periodically, and/or be manually activated by a user. The method 600 may determine whether the acoustic echo canceller 302 of the audio device 100 is not performing optimally, and then regenerate the inverse covariance matrix based on the current conditions of the audio device 100 (e.g., based on the current environment where the audio device 100 is located). The regenerated inverse covariance matrix resulting from the method 600 may therefore be more optimal for the current conditions of the audio device 100.

At step 602, the performance of the acoustic echo canceller 302 may be monitored, such as by monitoring metrics of the acoustic echo canceller 302. For example, the echo return loss enhancement (ERLE) metric may be monitored at step 602. The ERLE metric may indicate how much echo has been attenuated from an audio signal from the ratio of the reference signal 108 and the measured echo in the processed beamformed signal 110.

At step 604, it may be determined whether the performance of the acoustic echo canceller 302 is acceptable, based on the monitoring of step 602. For example, the performance of the acoustic echo canceller 302 may be deemed acceptable at step 604 if the ERLE metric satisfies a certain criteria, e.g., if the metric is lower than a particular threshold. If the performance of the acoustic echo canceller 302 is acceptable at step 604, then the method 600 may return to step 602 and continue the monitoring. However, if the performance of the acoustic echo canceller 302 is not acceptable at step 604, then the method 600 may continue to step 606. At step 606, the inverse covariance matrix may be regenerated, such as by performing the method 500 of FIG. 5 described above. In embodiments, a user may be notified at step 606 to recalibrate the audio device 100 to regenerate the inverse covariance matrix.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. An audio device configured to receive a reference signal, comprising:

a plurality of microphones configured to generate a plurality of audio signals;

a loudspeaker configured to play back the reference signal; and a first beamformer configured to generate a first beamformed signal based on the plurality of audio signals and a set of beamformer coefficients associated with a steering vector, wherein the first beamformer is configured to process the plurality of audio signals using a frequency domain beamforming technique with a stored beamforming parameter associated with the loudspeaker, wherein the stored beamforming parameter is based on echo from sound played on the loudspeaker.

2. The audio device of claim 1, further comprising a downstream processing module in communication with the first beamformer and the reference signal, the downstream processing module configured to perform acoustic echo cancellation of the reference signal on the first beamformed signal to generate a processed beamformed signal.

3. The audio device of claim 1, further comprising:

a second beamformer configured to generate a second beamformed signal based on the plurality of audio signals and the steering vector, wherein the steering vector is associated with a desired sound source location and the first beamformed signal is associated with a lobe steered towards the desired sound source location;

a voice activity detector configured to determine when voice activity is detected in the reference signal; and a switch in communication with the first beamformer, the second beamformer, the voice activity detector, and a downstream processing module, the switch configured to:

based on the voice activity being detected in the reference signal, select the first beamformed signal for transmission to the downstream processing module; and based on the voice activity not being detected in the reference signal, select the second beamformed signal for transmission to the downstream processing module.

4. The audio device of claim 3, further comprising the downstream processing module in communication with the first beamformer, the second beamformer and the reference signal, the downstream processing module configured to:

based on the voice activity being detected in the reference signal, perform acoustic echo cancellation of the reference signal on the first beamformed signal to generate a processed beamformed signal; and based on the voice activity not being detected in the reference signal, process the second beamformed signal to generate the processed beamformed signal.

5. The audio device of claim 1, wherein the frequency domain beamforming technique comprises a minimum variance distortionless response (MVDR) beamforming technique performed in a frequency domain.

6. The audio device of claim 1, wherein the steering vector is associated with a desired sound source location and the first beamformed signal is associated with a lobe steered towards the desired sound source location.

7. The audio device of claim 1, wherein the plurality of microphones and the loudspeaker are disposed in a same housing.

8. The audio device of claim 1, further comprising:

a second beamformer configured to generate a second beamformed signal based on the plurality of audio signals and the steering vector, wherein the steering vector is associated with a desired sound source location and the first beamformed signal is associated with a lobe steered towards the desired sound source location.

9. The audio device of claim 8, further comprising:

a first voice activity detector configured to determine when voice activity is detected in the reference signal; and a second voice activity detector configured to determine when voice activity is detected in at least one of the plurality of audio signals, wherein:

based on (1) the voice activity not being detected in the reference signal by the first voice activity detector and (2) the voice activity being detected in at least one of the plurality of audio signals by the second voice activity detector, the audio device is configured to:

update the steering vector towards a desired sound source; and update the set of beamformer coefficients for the first beamformer, based on the updated steering vector and the stored beamforming parameter; and based on (1) the voice activity not being detected in the reference signal by the first voice activity detector and (2) the voice activity not being detected in at least one of the plurality of audio signals by the second voice activity detector, the audio device is configured to:

update the steering vector towards the desired sound source.

10. The audio device of claim 1, wherein the stored beamforming parameter comprises a stored inverse covariance matrix; and wherein the first beamformer is further configured to update the stored inverse covariance matrix based on calibration audio played on the loudspeaker.

11. The audio device of claim 1, wherein the first beamformer is further configured to regenerate the stored beamforming parameter, based on monitoring a performance of an acoustic echo canceller of a downstream processing module of the audio device.

12. A method, comprising:

receiving a plurality of audio signals from a plurality of microphones;

receiving a reference signal for playback on a loudspeaker; and generating a first beamformed signal, using a first beamformer, based on the plurality of audio signals and a set of beamformer coefficients associated with a steering vector, wherein generating the first beamformed signal comprises processing the plurality of audio signals using a frequency domain beamforming technique with a stored beamforming parameter associated with the loudspeaker, wherein the stored beamforming parameter is based on echo from sound played on the loudspeaker.

13. The method of claim 12, further comprising performing acoustic echo cancellation of the reference signal on the first beamformed signal to generate a processed beamformed signal.

14. The method of claim 12, further comprising:

generating a second beamformed signal, using a second beamformer, based on the plurality of audio signals and the steering vector;

determining when voice activity is detected in the reference signal;

based on the voice activity being detected in the reference signal, selecting the first beamformed signal for transmission to a downstream processing module; and based on the voice activity not being detected in the reference signal, selecting the second beamformed signal for transmission to the downstream processing module.

15. The method of claim 14, further comprising:

based on the voice activity being detected in the reference signal, performing acoustic echo cancellation of the reference signal on the first beamformed signal to generate a processed beamformed signal, using the downstream processing module; and based on the voice activity not being detected in the reference signal, processing the second beamformed signal to generate the processed beamformed signal, using the downstream processing module.

16. The method of claim 12, wherein the frequency domain beamforming technique comprises a minimum variance distortionless response (MVDR) beamforming technique performed in a frequency domain.

17. The method of claim 12, wherein the steering vector is associated with a desired sound source location and the first beamformed signal is associated with a lobe steered towards the desired sound source location.

18. The method of claim 12, wherein the plurality of microphones and the loudspeaker are disposed in a same housing.

19. The method of claim 12, further comprising:

generating a second beamformed signal based on the plurality of audio signals and the steering vector, wherein the steering vector is associated with a desired sound source location and the first beamformed signal is associated with a lobe steered towards the desired sound source location.

20. The method of claim 19, further comprising:

determining, by a first voice activity detector, when voice activity is detected in the reference signal;

determining, by a second voice activity detector, when voice activity is detected in at least one of the plurality of audio signals;

based on (1) the voice activity not being detected in the reference signal by the first voice activity detector and (2) the voice activity being detected in at least one of the plurality of audio signals by the second voice activity detector:

updating the steering vector towards a desired sound source; and updating the set of beamformer coefficients based on the updated steering vector and the stored beamforming parameter; and based on (1) the voice activity not being detected in the reference signal by the first voice activity detector and (2) the voice activity not being detected in at least one of the plurality of audio signals by the second voice activity detector:

updating the steering vector towards the desired sound source.

21. The method of claim 12, wherein the stored beamforming parameter comprises a stored inverse covariance matrix;

the method further comprising updating the stored inverse covariance matrix based on calibration audio played on the loudspeaker.

22. The method of claim 12, further comprising regenerating the stored beamforming parameter, based on monitoring a performance of an acoustic echo canceller of a downstream processing module.

* * * * *